US012807221B2

(12) United States Patent
Shen et al.

(10) Patent No.: US 12,807,221 B2
(45) Date of Patent: Nov. 24, 2026

(54) VEHICLE CONTROL METHOD AND APPARATUS, CONTROLLER, SYSTEM, AND STORAGE MEDIUM

(71) Applicant: Shanghai Huace Navigation Technology LTD., Shanghai (CN)

(72) Inventors: Xuefeng Shen, Shanghai (CN); Fei Sun, Shanghai (CN); Qiang Ren, Shanghai (CN); Guangyang Dong, Shanghai (CN); Shaoxi Feng, Shanghai (CN)

(73) Assignee: SHANGHAI HUACE NAVIGATION TECHNOLOGY LTD, Shanghai (CN)

( * ) Notice: Subject to any disclaimer, the term of this patent is extended or adjusted under 35 U.S.C. 154(b) by 187 days.

(21) Appl. No.: 18/717,054

(22) PCT Filed: Mar. 3, 2022

(86) PCT No.: PCT/CN2022/078942
§ 371 (c)(1),
(2) Date: Jun. 6, 2024

(87) PCT Pub. No.: WO2023/103188
PCT Pub. Date: Jun. 15, 2023

(65) Prior Publication Data

US 2025/0042469 A1 Feb. 6, 2025

(30) Foreign Application Priority Data

Dec. 6, 2021 (CN) ......................... 202111477499.1

(51) Int. Cl.
*B62D 6/00* (2006.01)
*A01B 69/04* (2006.01)
(Continued)

(52) U.S. Cl.
CPC ............ *B62D 6/002* (2013.01); *A01B 69/008* (2013.01); *B60W 40/00* (2013.01); *B60W 50/00* (2013.01);
(Continued)

(58) Field of Classification Search
None
See application file for complete search history.

(56) References Cited

U.S. PATENT DOCUMENTS 9,969,424 B2 * 5/2018 Guy ..................... B62D 5/0463
10,124,827 B2 * 11/2018 Nykamp .................. B62D 5/04
(Continued)

FOREIGN PATENT DOCUMENTS

CN 107063241 A * 8/2017 ............. G01S 19/53
CN 108657269 A * 10/2018 ............... B62D 5/04
(Continued)

OTHER PUBLICATIONS

Chinese First Office Action issued in Application Serial No. 202111477499.1 on Mar. 27, 2023.
(Continued)

*Primary Examiner* — Kevin R Steckbauer
(74) *Attorney, Agent, or Firm* — Mark H. Whittenberger; Holland & Knight LLP

(57) ABSTRACT

Provided are a vehicle control method and apparatus, a device, and a storage medium. The vehicle control method includes: acquiring positioning data output by a GNSS module and IMU data output by an IMU module, and acquiring attitude angle data based on the positioning data and the IMU data; acquiring rotation angle information of a vehicle front wheel based on the IMU data, motor position encoder data of an electric steering wheel, and vehicle size data; acquiring target rotation angle information of the vehicle front wheel based on the positioning data, the
(Continued)

attitude angle data, the vehicle size data, the rotation angle information of the vehicle front wheel, and planned path data; generating target control information based on the target rotation angle information, and sending the target control information to the electric steering wheel so that the electric steering wheel rotates based on the target control information.

20 Claims, 5 Drawing Sheets

(51) Int. Cl.

| | |
|---|---|
| ***B60W 40/00*** | (2006.01) |
| ***B60W 50/00*** | (2006.01) |
| ***B60W 60/00*** | (2020.01) |
| ***B62D 15/02*** | (2006.01) |
| ***G01S 19/53*** | (2010.01) |

(52) U.S. Cl.

CPC ......... *B60W 60/001* (2020.02); *B62D 15/025* (2013.01); *G01S 19/53* (2013.01)

(56) References Cited

U.S. PATENT DOCUMENTS

| | | | | |
|---|---|---|---|---|
| 10,858,038 | B2 * | 12/2020 | Guy | B62D 5/0463 |
| 11,745,726 | B2 * | 9/2023 | Bosse | B62D 15/025 701/41 |
| 11,794,756 | B2 * | 10/2023 | Bosse | G06F 17/17 |
| 12,008,845 | B2 * | 6/2024 | Sakaguchi | G01D 5/244 |
| 12,024,246 | B2 * | 7/2024 | Mizoguchi | B62D 6/003 |
| 2016/0147225 | A1 * | 5/2016 | Sights | G05D 1/0088 701/23 |
| 2017/0361868 | A1 * | 12/2017 | Guy | B62D 5/0463 |
| 2018/0057046 | A1 * | 3/2018 | Nykamp | B62D 5/04 |
| 2018/0113473 | A1 * | 4/2018 | Webber | A01B 69/007 |
| 2018/0257699 | A1 * | 9/2018 | Guy | B62D 5/0463 |
| 2020/0180692 | A1 * | 6/2020 | Hara | G06F 16/9537 |
| 2021/0061348 | A1 * | 3/2021 | Araki | B62D 61/08 |
| 2021/0086826 | A1 * | 3/2021 | Guy | B60G 17/0165 |
| 2021/0291833 | A1 * | 9/2021 | Zhang | B60W 30/06 |
| 2021/0310809 | A1 * | 10/2021 | Chen | G01S 19/49 |
| 2022/0084330 | A1 * | 3/2022 | Sakaguchi | G01D 5/244 |
| 2022/0242481 | A1 * | 8/2022 | Mizoguchi | B62D 6/003 |
| 2023/0001915 | A1 * | 1/2023 | Bosse | B60W 30/045 |
| 2023/0001934 | A1 * | 1/2023 | Bosse | B60W 30/045 |
| 2024/0273698 | A1 * | 8/2024 | Rapp | G01B 11/2755 |
| 2024/0317283 | A1 * | 9/2024 | Jiang | B60W 40/103 |
| 2024/0319736 | A1 * | 9/2024 | Takehara | B60W 40/114 |
| 2024/0326905 | A1 * | 10/2024 | Sato | B62D 6/02 |
| 2024/0391470 | A1 * | 11/2024 | Jin | B60W 40/114 |
| 2025/0042469 | A1 * | 2/2025 | Shen | A01B 69/008 |
| 2025/0083683 | A1 * | 3/2025 | Yang | B60W 50/00 |
| 2025/0083741 | A1 * | 3/2025 | Yang | B60L 15/2036 |
| 2025/0091593 | A1 * | 3/2025 | Kasaiezadeh Mahabadi | B60W 50/029 |
| 2025/0115293 | A1 * | 4/2025 | Onozuka | B62D 6/002 |
| 2025/0170951 | A1 * | 5/2025 | Barrellon | B60Q 1/346 |
| 2025/0170952 | A1 * | 5/2025 | Barrellon | B60Q 1/40 |
| 2025/0178614 | A1 * | 6/2025 | Rydström | B60T 8/1708 |

FOREIGN PATENT DOCUMENTS

| | | | | |
|---|---|---|---|---|
| CN | 108663036 | A * | 10/2018 | G01C 1/00 |
| CN | 110530361 | A * | 12/2019 | G01C 21/165 |
| CN | 111216708 | A * | 6/2020 | G01S 19/54 |
| CN | 111634331 | A * | 9/2020 | B62D 6/001 |
| CN | 112014122 | A * | 12/2020 | G01C 19/00 |
| CN | 108657269 | B * | 3/2021 | B62D 6/00 |
| CN | 111634331 | B * | 4/2021 | B62D 6/001 |
| CN | 112965373 | A * | 6/2021 | G05B 13/042 |
| CN | 112977603 | A * | 6/2021 | B62D 5/046 |
| CN | 113126136 | A * | 7/2021 | G01S 19/47 |
| CN | 108663036 | B * | 11/2021 | G01C 19/00 |
| CN | 114019954 | A * | 2/2022 | G05D 1/0223 |
| CN | 114162139 | A * | 3/2022 | B60W 50/00 |
| CN | 114633800 | A * | 6/2022 | B62D 15/024 |
| CN | 113137958 | B * | 7/2022 | G01C 15/00 |
| CN | 115268437 | A * | 11/2022 | G05D 1/0242 |
| CN | 115727868 | A * | 3/2023 | |
| CN | 115848493 | A * | 3/2023 | |
| CN | 116261697 | A * | 6/2023 | G01C 22/02 |
| CN | 114633800 | B * | 8/2023 | B62D 15/024 |
| CN | 117148844 | A * | 12/2023 | |
| CN | 114019954 | B * | 2/2024 | G05D 1/0223 |
| CN | 114162139 | B * | 3/2024 | B60W 50/00 |
| CN | 118168825 | A * | 6/2024 | G01M 17/06 |
| CN | 118701172 | A * | 9/2024 | B62D 15/021 |
| CN | 119085598 | A * | 12/2024 | B60W 40/10 |
| CN | 119459860 | A * | 2/2025 | G05B 11/42 |
| CN | 119512106 | A * | 2/2025 | G05D 1/648 |
| CN | 119659745 | A * | 3/2025 | |
| CN | 119935160 | A * | 5/2025 | |
| CN | 119935160 | B * | 7/2025 | |
| EP | 4446190 | A1 * | 10/2024 | B60W 50/00 |
| JP | 09-091038 | A | 4/1997 | |
| JP | H0991038 | A * | 4/1997 | |
| JP | 09-154308 | A | 6/1997 | |
| JP | 10-164909 | A | 6/1998 | |
| JP | 3594498 | B2 * | 12/2004 | |
| JP | 2018-084899 | A | 5/2018 | |
| JP | 2020-030625 | A | 2/2020 | |
| JP | 2020-095566 | A | 6/2020 | |
| JP | 2021177168 | A * | 11/2021 | G01C 21/165 |
| JP | 2025502624 | A * | 1/2025 | B60W 50/00 |
| JP | 7688781 | B2 * | 6/2025 | B60W 50/00 |
| KR | 20230086628 | A * | 6/2023 | B60W 50/00 |
| WO | WO-2023278152 | A1 * | 1/2023 | B60W 40/114 |
| WO | WO-2023103188 | A1 * | 6/2023 | B60W 50/00 |

OTHER PUBLICATIONS

Chinese Second Office Action issued in Application Serial No. 202111477499.1 on Nov. 14, 2023.

International Search Report issued in Application Serial No. PCT/CN2022/078942 on Sep. 13, 2022.

He Jie et al., Wheel steering angle measurement method of agricultural machinery based on GNSS heading 4 differential and MEMS gyroscope. Journal of South China Agricultural University 2020, 41(5): 91-98.

Decision to Grant issued in related Japanese Application Serial No. 2024-534169 on Apr. 25, 2025.

Extended European Search Report issued in related Application Serial No. 22902632.3 on Nov. 25, 2025.

* cited by examiner

VEHICLE CONTROL METHOD AND APPARATUS, CONTROLLER, SYSTEM, AND STORAGE MEDIUM

CROSS-REFERENCE TO RELATED APPLICATIONS

This application is a U.S. National Stage of International Patent Application No. PCT/CN2022/078942, filed on Mar. 3, 2022, which claims priority to Chinese Patent Application No. 202111477499.1, filed on Dec. 6, 2021. The disclosures of which are incorporated herein by reference in their entirety.

TECHNICAL FIELD

The present application relates to the field of autonomous driving technology, for example, a vehicle control method and apparatus, a controller, a system, and a storage medium.

BACKGROUND

As a key technology of precision agriculture, automatic driving of agricultural machinery is widely used in agricultural production processes such as farming, sowing, fertilizing, spraying, and harvesting. Classic key technologies for the automatic driving of agricultural machinery include navigation pose information acquisition, navigation path planning, and navigation control. Accurate and reliable acquisition of the navigation pose information is a prerequisite for the path planning and vehicle body control. An optimized navigation path can effectively reduce resource waste, such as reducing repetitive and missing operations and reducing turning paths at the edge of a field. Fast and stable navigation and control can cope with the complex road environment of farmland to accurately track the navigation path.

Solutions for automatic driving of agricultural machinery require the installation of a display and an angle sensor in a vehicle, and there are many and complex wiring harnesses that needs to be installed. Due to the complexity of farmland operations, wiring harnesses often get hung up. Moreover, there are many system components, and the cost is relatively high.

SUMMARY

The present application provides a vehicle control method and apparatus, a controller, a system, and a storage medium to achieve rapid and stable control of vehicle driving and reduce cost consumption.

The present application provides a vehicle control method. The method includes the steps below.

Positioning data output by a global navigation satellite system (GNSS) module and IMU data output by an inertial measurement unit (IMU) module are acquired, and attitude angle data is acquired based on the positioning data and the IMU data.

Rotation angle information of a vehicle front wheel is acquired based on the IMU data, motor position encoder data of an electric steering wheel, and vehicle size data.

Target rotation angle information of the vehicle front wheel is acquired based on the positioning data, the attitude angle data, the vehicle size data, the rotation angle information of the vehicle front wheel, and planned path data.

Target control information is generated based on the target rotation angle information, and the target control information is sent to the electric steering wheel so that the electric steering wheel rotates based on the target control information.

The present application further provides an integrated controller. The integrated controller includes a mobile communication signal receiver, an IMU module, and a central processing unit.

The mobile communication signal receiver is configured to receive differential information sent by a base station or a server and send the differential information to a GNSS module.

The GNSS module is configured to acquire positioning data based on the differential information.

The IMU module is configured to acquire IMU data.

The central processing unit is configured to acquire attitude angle data based on the positioning data and the IMU data; acquire rotation angle information of a vehicle front wheel based on the IMU data, motor position encoder data of an electric steering wheel, and vehicle size data; acquire target rotation angle information of the vehicle front wheel based on the positioning data, the attitude angle data, the vehicle size data, the rotation angle information of the vehicle front wheel, and planned path data; and generate target control information based on the target rotation angle information and send the target control information to the electric steering wheel so that the electric steering wheel rotates based on the target control information.

The present application further provides an agricultural machinery automatic driving system.

The system includes the preceding integrated controller, a handle, and an electric steering wheel.

The handle is configured to perform at least one of the following: enabling or disabling an automatic driving state based on a user operation or sending planned path data configured by a user to a central processing unit of the integrated controller.

The electric steering wheel is configured to receive target control information sent by the central processing unit and rotate based on the received target control information to drive a vehicle front wheel to rotate.

The present application further provides a vehicle control apparatus. The apparatus includes a data acquisition module, a vehicle front wheel rotation angle determination module, a target rotation angle determination module, and a steering wheel control module.

The data acquisition module is configured to acquire positioning data output by a global navigation satellite system (GNSS) module and IMU data output by an inertial measurement unit (IMU) module and acquire attitude angle data based on the positioning data and the IMU data.

The vehicle front wheel rotation angle determination module is configured to acquire rotation angle information of a vehicle front wheel based on the IMU data, motor position encoder data of an electric steering wheel, and vehicle size data.

The target rotation angle determination module is configured to acquire target rotation angle information of the vehicle front wheel based on the positioning data, the attitude angle data, the vehicle size data, the rotation angle information of the vehicle front wheel, and planned path data.

The steering wheel control module is configured to generate target control information based on the target rotation angle information and send the target control information to the electric steering wheel so that the electric steering wheel rotates based on the target control information.

The present application further provides a computer-readable storage medium storing a computer program. The computer program, when executed by a processor, performs the preceding vehicle control method.

DETAILED DESCRIPTION

Figure 1:
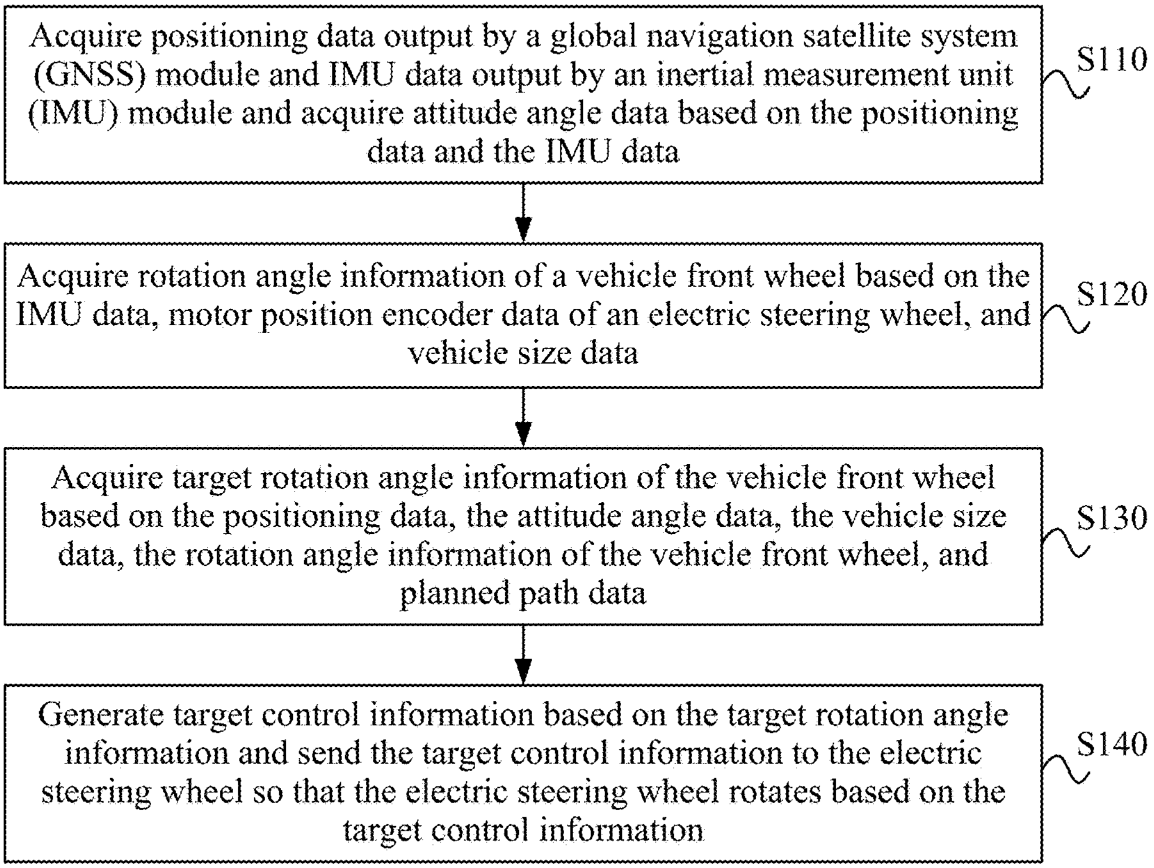
FIG. 1 is a flowchart of a vehicle control method according to embodiment one of the present application.

The present application is described below in conjunction with drawings and embodiments. The specific embodiments set forth below are intended to explain the preset application. For ease of description, only parts related to the present application are illustrated in the drawings.

Similar reference numerals and letters indicate similar items in the following drawings; once a particular item is defined in a drawing, the item does not need to be defined or explained in subsequent drawings. In the description of the present application, terms such as "first" and "second" are only intended to distinguish the description and are not to be construed as indicating or implying relative importance.

Embodiment One

FIG. 1 is a flowchart of a vehicle control method according to embodiment one of the present application. This embodiment may be applied to the situation of controlling automatic driving of vehicles. The method may be executed by a vehicle control apparatus in the embodiment of the present application. The apparatus may be implemented in software and/or hardware. As shown in FIG. 1, the method includes the steps below.

In S110, positioning data output by a global navigation satellite system (GNSS) module and IMU data output by an inertial measurement unit (IMU) module are acquired, and attitude angle data is acquired based on the positioning data and the IMU data.

GNSS generally refers to all satellite navigation systems, which have omnipotent, global, all-weather, continuous, and real-time navigation, positioning, and timing functions. In the embodiment of the present application, the GNSS module supports both GNSS positioning and GNSS orientation. GNSS orientation may determine the direction of the geometric vector formed by two points in space in a given coordinate system. The positioning data output by the GNSS module may be received using a GNSS receiving antenna. The positioning data includes location positioning information and orientation information. The GNSS module also supports enhanced modes such as real-time kinematic (RTK) positioning, satellite-based augmentation system (SBAS), differential global positioning system (DGPS), and Precise Point Positioning (PPP) technology. IMU may be configured to detect and measure acceleration and a rotational motion state. In the embodiment of the present application, the IMU module may collect and output IMU data, and the IMU data includes a rotational angular velocity of a vehicle body and an acceleration of the vehicle body. The attitude angle data is calculated based on the GNSS positioning data and the IMU data. The attitude angle data includes a heading angle, a pitch angle, and a roll angle.

In S120, rotation angle information of a vehicle front wheel is acquired based on the IMU data, motor position encoder data of an electric steering wheel, and vehicle size data.

The motor position encoder data of the electric steering wheel represents the current rotation position of the electric steering wheel. The vehicle size data includes the distance between the front and rear axles of a vehicle body, the height of a rear axle, front track, the distance from an antenna to a central axis, the position of the antenna relative to the central axis, the distance from the antenna to the rear axle, the position of the antenna relative to the rear axle, the height of the antenna, and the operation width. The vehicle size data may be used to build vehicle kinematics models and perform data corrections.

Figure 2:
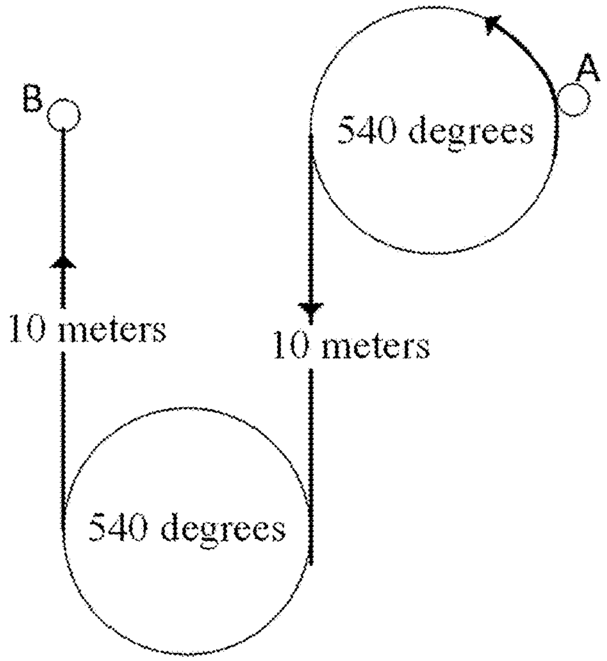
FIG. 2 is a diagram illustrating the calibration of an electric steering wheel according to embodiment one of the present application.

Vehicle size information may be entered by using a terminal device such as a mobile phone or a tablet, and the electric steering wheel is calibrated. FIG. 2 is a diagram illustrating the calibration of an electric steering wheel according to embodiment one of the present application, as shown in FIG. 2. The process of calibrating the electric steering wheel is described in steps 1 to 6. The calibration process requires an open, flat, and hard ground approximately 100 meters long and 10 meters wide. In FIG. 2, two circles represent the vehicle's driving path; "540 degrees" means that the electric steering wheel is rotated to enable the vehicle to rotate 540 degrees; "10 meters" means that after rotating 540 degrees, the vehicle drives forward 10 meters.

In step 1, a line AB is configured. The distance between two points A and B should be greater than 70 meters.

In step 2, after the line AB is configured, the vehicle is manually turned around and parked at point B with the front of the vehicle facing point A.

In step 3, the vehicle keeps driving forward at a constant speed of 2 Km/h and drives automatically to point A.

In step 4, the vehicle is manually turned around and parked at point A with the front of the vehicle facing point B.

In step 5, the vehicle keeps driving forward at a constant speed of 2 Km/h and drives automatically to point B.

Figure 3:
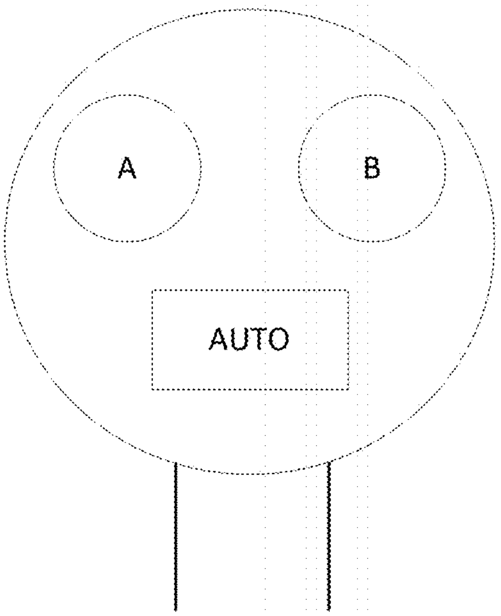
FIG. 3 is a diagram of buttons of a handle according to embodiment one of the present application.

In step 6, calibration is completed. FIG. 3 is a diagram of buttons of a handle according to embodiment one of the present application. As shown in FIG. 3, the handle includes at least three buttons. During the practical operation, the AUTO button controls whether to enable or disable the automatic driving state. Buttons "A" and "B" on the handle control the linear path planning operation of points A and B. After the electric steering wheel is calibrated, installation offset calibration may be performed on a terminal device. The installation offset calibration can eliminate related installation errors. Performing calibration on the electric steering wheel via the preceding steps may establish execution mechanism system identification, that is, a function relationship between a steering wheel rotation angle and a rotation angle of the vehicle front wheel may be established.

The rotation angle information of the vehicle front wheel is acquired based on the IMU data, the motor position encoder data of the electric steering wheel, and the vehicle size data. The vehicle front wheel angle information refers to information such as the current vehicle front wheel rotation angle and rotation angle direction.

In S130, target rotation angle information of the vehicle front wheel is acquired based on the positioning data, the attitude angle data, the vehicle size data, the rotation angle information of the vehicle front wheel, and planned path data.

The planned path data may be obtained in the form of web page access by WIFI, Bluetooth, or a mobile communication data link. The planned path data may be imported via a mobile phone or obtained by a user operating the buttons of the handle. The positioning data, the attitude angle data, the vehicle size data, the rotation angle information of the vehicle front wheel, and the planned path data are input into a vehicle kinematics model to acquire the target rotation angle information of the vehicle front wheel output by the model. The target rotation angle information of the vehicle front wheel includes the angle information and direction information at which the vehicle's front wheels should rotate at the next moment.

In S140, target control information is generated based on the target rotation angle information, and the target control information is sent to the electric steering wheel so that the electric steering wheel rotates based on the target control information.

The target rotation angle information is the angle information at which the front wheels of the vehicle controlled by the steering wheel should rotate. The target control information may be generated according to the target rotation angle information. In this solution embodiment, in an embodiment, generating the target control information based on the target rotation angle information includes steps A1 and A2.

In step A1, a preset function relationship between a steering wheel rotation angle and a rotation angle of the vehicle front wheel is acquired.

By the rotation of the electric steering wheel, the vehicle's front wheels may be controlled to rotate. A function relationship exists between the rotation angle of the electric steering wheel and the rotation angle of the front wheel. The function relationship may be acquired via the preceding calibration process of the electric steering wheel. If the rotation angle of the electric steering wheel is known, the rotation angle of the vehicle front wheel may be obtained. If the rotation angle of the vehicle front wheel is known, the rotation angle of the electric steering wheel may be obtained.

In step A2, based on the function relationship, a target steering wheel rotation angle corresponding to the target rotation angle information is determined, and the target control information is generated based on the target steering wheel rotation angle.

The target rotation angle information includes the angle information at which the vehicle's front wheels should rotate and the direction information at which the vehicle's front wheels should rotate. The target steering wheel rotation angle is the angle at which the electric steering wheel should rotate. As described in step A1, after the information about the angle at which the front wheels of the vehicle should rotate is learned, the rotation angle of the electric steering wheel, that is, the target steering wheel rotation angle may be obtained based on the preset function relationship. The target control information includes the target steering wheel rotation angle. After the target steering wheel rotation angle is obtained, target control information is generated to control the electric steering wheel to rotate based on the target control information.

Via the preceding steps, the electric steering wheel rotates based on the target control information, and the vehicle can be accurately and rapidly controlled to drive according to the path planning information, achieving automatic driving of the vehicle.

In the technical solution of this embodiment, positioning data output by a global navigation satellite system (GNSS) module and IMU data output by an inertial measurement unit (IMU) module are acquired, and attitude angle data is acquired based on the positioning data and the IMU data; rotation angle information of a vehicle front wheel is acquired based on the IMU data, motor position encoder data of an electric steering wheel, and vehicle size data; target rotation angle information of the vehicle front wheel is acquired based on the positioning data, the attitude angle data, the vehicle size data, the rotation angle information of the vehicle front wheel, and planned path data; target control information is generated based on the target rotation angle information, and the target control information is sent to the electric steering wheel so that the electric steering wheel rotates based on the target control information. In the technical solution of this embodiment, GNSS positioning data accurate to a centimeter level can be acquired; via a mobile terminal, vehicle parameters can be configured, calibration can be performed, and path planning data can be designed; after the configuration, the vehicle can be driven automatically detached from the terminal. Moreover, fixed-point navigation line control and enabling and disabling of the automatic driving function can be achieved through the buttons of the handle. In this manner, it is easy to installation and maintenance hardware facilities, which greatly reduces consumption costs and reduces the hardware damage rate of the automatic driving system. Additionally, the driving state of the vehicle can be quickly and stably controlled. In the embodiment of the present application, accurate and reliable navigation pose information can be acquired. When the environment and road conditions are complex, the driving state of the vehicle can be quickly and stably controlled. Traditional displays and angle sensors do not need to be used. Thus, it is easy to install and maintain hardware facilities, which greatly reduces costs.

Embodiment Two

Figure 4:
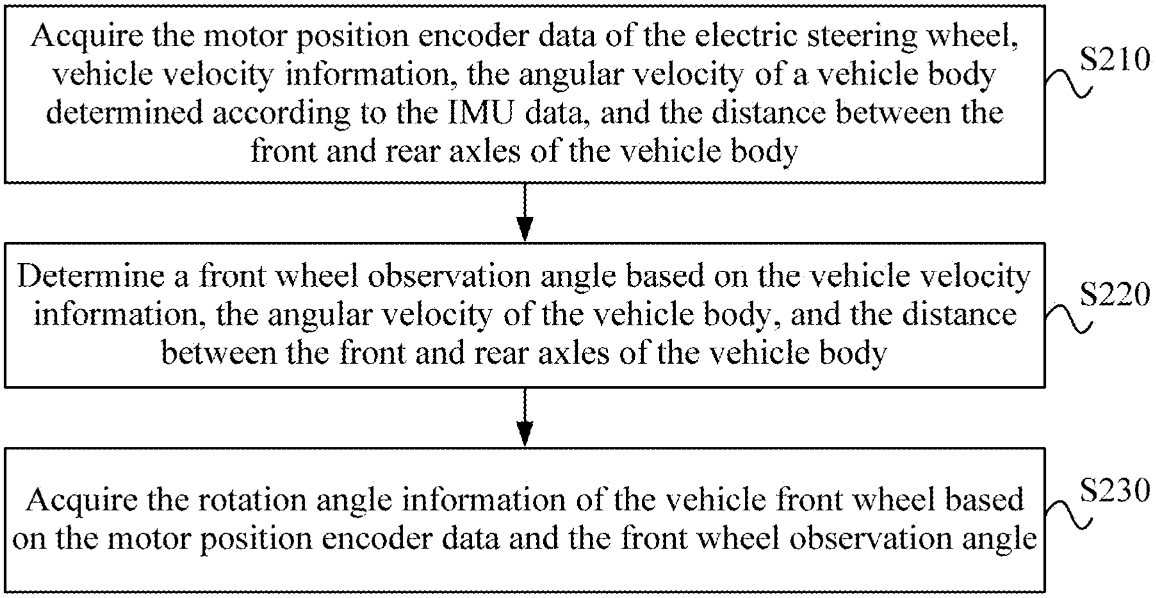
FIG. 4 is a flowchart of a vehicle control method according to embodiment two of the present application.

FIG. 4 is a flowchart of a vehicle control method according to embodiment two of the present application. This embodiment refines the method for acquiring the rotation angle information of the vehicle front wheel based on the preceding embodiment. As shown in FIG. 4, the method provided by this embodiment includes the steps below.

In S210, the motor position encoder data of the electric steering wheel, vehicle velocity information, the angular velocity of a vehicle body determined according to the IMU data, and the distance between the front and rear axles of the vehicle body are acquired.

The motor position encoder data of the electric steering wheel includes data such as the current rotation position, rotation angle, and rotation velocity of the electric steering wheel. The vehicle velocity information includes the current velocity and direction information of the vehicle. The motor position encoder data of the electric steering wheel may be obtained by a motor position encoder. After the vehicle is started, the vehicle velocity information may be determined by the data output in real time by the GNSS module. In S110, the IMU data may be acquired, and the IMU data includes a vehicle's rotational angular velocity. When the vehicle velocity increases to a preset threshold, the forward and reverse states of the vehicle may be determined using the mean information of historical IMU data. If the mean information is positive, the vehicle is in the forward state. If the mean information is negative, the vehicle is in the reverse state. In S120, the vehicle size data may be acquired, and the vehicle size data includes the distance between the front and rear axles of the vehicle body.

In S220, a front wheel observation angle is determined based on the vehicle velocity information, the angular velocity of the vehicle body, and the distance between the front and rear axles of the vehicle body.

In this solution embodiment, in an embodiment, the front wheel observation angle may be determined based on the vehicle velocity information, the angular velocity of the vehicle body, and the distance between the front and rear axles of the vehicle body by using the following formula:

$$W = \arctan\left(\frac{\varphi_A V_{gnss}}{L}\right).$$

L denotes the distance between the front and rear axles of the vehicle body. $V_{gnss}$ denotes the vehicle velocity information. $\varphi_A$ denotes the angular velocity of the vehicle body. W denotes the front wheel observation angle.

The front wheel observation angle can be calculated according to the vehicle velocity information, the angular velocity of the vehicle body, and the distance between the front and rear axles of the vehicle body. The calculation method is simple, the data required for calculation is easy to obtain, and the accuracy of vehicle automatic driving data can be improved.

In S230, the rotation angle information of the vehicle front wheel is acquired based on the motor position encoder data and the front wheel observation angle.

After the front wheel observation angle is calculated, the rotation angle information of the vehicle front wheel is acquired based on the motor position encoder data and the front wheel observation angle. In this solution embodiment, in an embodiment, acquiring the rotation angle information of the vehicle front wheel includes step B1 and step B2.

In step B1, the angular velocity of the vehicle front wheel is determined based on the motor position encoder data.

In this solution embodiment, in an embodiment, determining the angular velocity of the vehicle front wheel based on the motor position encoder data includes steps B11 to B13.

In step B11, dead zone correction is performed on the motor position encoder data based on an imported dead zone value.

The motor position encoder data includes data such as the current rotation position, rotation angle, and rotation velocity of the electric steering wheel. In the process of generating the preceding data, the motor position encoder generates a control signal dead zone. The dead zone correction may be performed on the motor position encoder data based on the dead zone value. The dead zone value may be obtained by the import of a terminal device, such as a mobile phone, a tablet, or a notebook computer. By the adjustment of the dead zone value, dead zone correction may be performed on the motor position encoder data.

In step B12, the position increment of the electric steering wheel is determined according to the corrected motor position encoder data, and an angular velocity of the electric steering wheel is determined according to the position increment and a sampling period.

The position increment of the electric steering wheel is the positional movement amount of the electric steering wheel at the current moment relative to the previous moment. The motor position encoder samples the steering angle of the electric steering wheel at a certain frequency. The sampling period is a sampling time interval. The angular velocity of the electric steering wheel may be determined according to the position increment and the sampling period. For example, the position increment of the electric steering wheel is S, the sampling period is t, and then the angular velocity=S/t.

In step B13, the angular velocity of the vehicle front wheel is determined according to the angular velocity of the electric steering wheel and a preset function relationship between a steering wheel rotation angle and a rotation angle of the vehicle front wheel.

The method for determining the angular velocity of the vehicle front wheel by the preceding steps may be applied to determine the angular velocity of the front wheel of a wheel-steering tractor to meet the operation requirements of the wheel-steering tractor.

As described in S140, the rotation angle of the target vehicle front wheel may be determined by using the function relationship between the rotation angle of the electric steering wheel and the rotation angle of the vehicle front wheel. The angular velocity of the vehicle front wheel may be determined according to the angular velocity of the electric steering wheel and the function relationship.

In step B2, the rotation angle information of the vehicle front wheel is acquired by using a filter model according to the angular velocity of the vehicle front wheel and the front wheel observation angle.

The filter model may be a Kalman filter. The Kalman filter is an algorithm that may use a linear system state equation to perform optimal estimation of a system state by using the input and output observation data of the system. In this solution embodiment, the Kalman filter model may be established according to an angle tracking algorithm. The angular velocity of the vehicle front wheel and the front wheel observation angle are input into the Kalman filter model, and the Kalman filter operation is performed, thereby outputting the rotation angle information of the vehicle front wheel in real time.

Through the preceding steps, the rotation angle information of the vehicle front wheel is determined, and the Kalman filter model is established, which can output accurate rotation angle information of the vehicle front wheel in real time.

Figure 5:
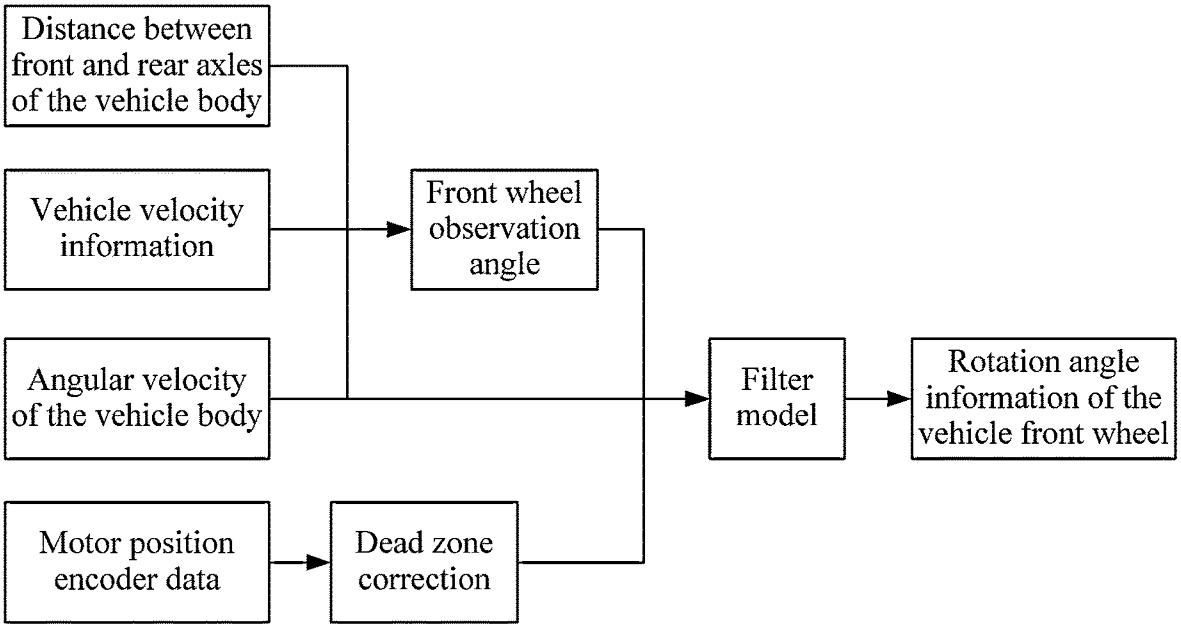
FIG. 5 is a diagram illustrating the acquisition of rotation angle information of a vehicle front wheel according to embodiment two of the present application.

FIG. 5 is a diagram illustrating the acquisition of rotation angle information of a vehicle front wheel according to embodiment two of the present application, as shown in FIG. 5. A front wheel observation angle is acquired based on the distance between the front and rear axles of the vehicle body, the vehicle velocity information, and the angular velocity of the vehicle body; the dead zone correction is performed on the motor position encoder data; the rotation angle information of the vehicle front wheel is acquired by using a filter model.

In the technical solution of this embodiment, the motor position encoder data of the electric steering wheel, the vehicle velocity information, the angular velocity of the vehicle body determined according to the IMU data, and the distance between the front and rear axles of the vehicle body are acquired; a front wheel observation angle is determined based on the vehicle velocity information, the angular velocity of the vehicle body, and the distance between the front and rear axles of the vehicle body; the rotation angle information of the vehicle front wheel is acquired based on the motor position encoder data and the front wheel observation angle. A forward and reverse determination algorithm can be used to distinguish the forward or reverse state of the vehicle. The operation requirements of a wheel-steering tractor are met through a method suitable for determining the angular velocity of the front wheels of the wheel-steering tractor. Thus, the technical solution of this embodiment is easy to promote and use.

Embodiment Three

Figure 6:
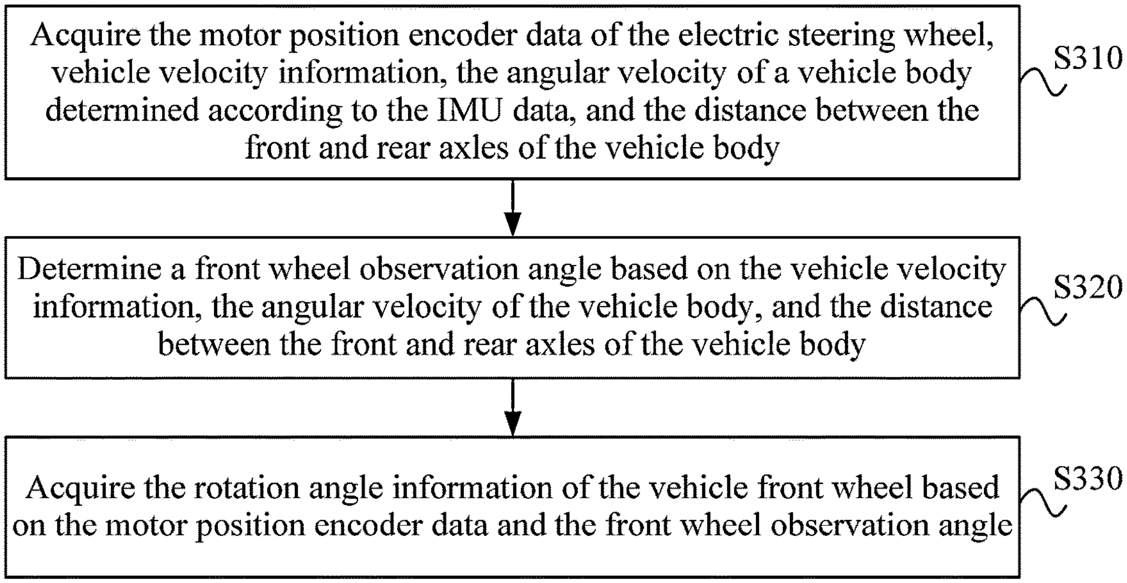
FIG. 6 is a flowchart of a vehicle control method according to embodiment three of the present application.

FIG. 6 is a flowchart of a vehicle control method according to embodiment three of the present application. This embodiment refines the method for acquiring the rotation angle information of the vehicle front wheel based on the preceding embodiments. As shown in FIG. 6, the method of this embodiment includes steps below.

In S310, the motor position encoder data of the electric steering wheel, the vehicle velocity information, the angular velocity of the vehicle body determined according to the IMU data, and the distance between the front and rear axles of the vehicle body are acquired.

In S320, the front wheel observation angle is determined based on the vehicle velocity information, the angular velocity of the vehicle body, and the distance between the front and rear axles of the vehicle body.

In S330, the rotation angle information of the vehicle front wheel is acquired based on the motor position encoder data and the front wheel observation angle.

In this solution embodiment, in an embodiment, acquiring the rotation angle information of the vehicle front wheel based on the motor position encoder data and the front wheel observation angle includes steps C1 and C2.

In step C1, a median value in the motor position encoder data is compensated according to the front wheel observation angle and a present function relationship between a steering wheel rotation angle and a rotation angle of the vehicle front wheel.

First, the steering wheel rotation angle corresponding to the front wheel observation angle may be obtained according to the function relationship between the steering wheel rotation angle and the rotation angle of the vehicle front wheel. Then, the steering wheel rotation angle is used to perform median compensation on the motor position encoder data, and it is detected whether a deviation exists between the median value in the motor position encoder data and the steering wheel rotation angle. If a deviation exists, the median value in the motor position encoder data is compensated.

In step C2, the rotation angle information of the vehicle front wheel is acquired based on compensated motor position encoder data and the preset function relationship between the steering wheel rotation angle and the rotation angle of the vehicle front wheel.

The rotation angle of the vehicle front wheel may be calculated by using the preset function relationship between the rotation angle of the steering wheel and the rotation angle of the vehicle front wheel. The rotation angle information of the vehicle front wheel is acquired. The rotation angle information of the vehicle front wheel includes the rotation angle of the vehicle front wheel rotates and the rotation direction of the vehicle front wheel rotates.

The method for determining the rotation angle information of the vehicle front wheel by the preceding steps may be applied to determine the rotation angle information of the front wheels of a rice transplanter to meet the operation requirements of the rice transplanter.

Figure 7:
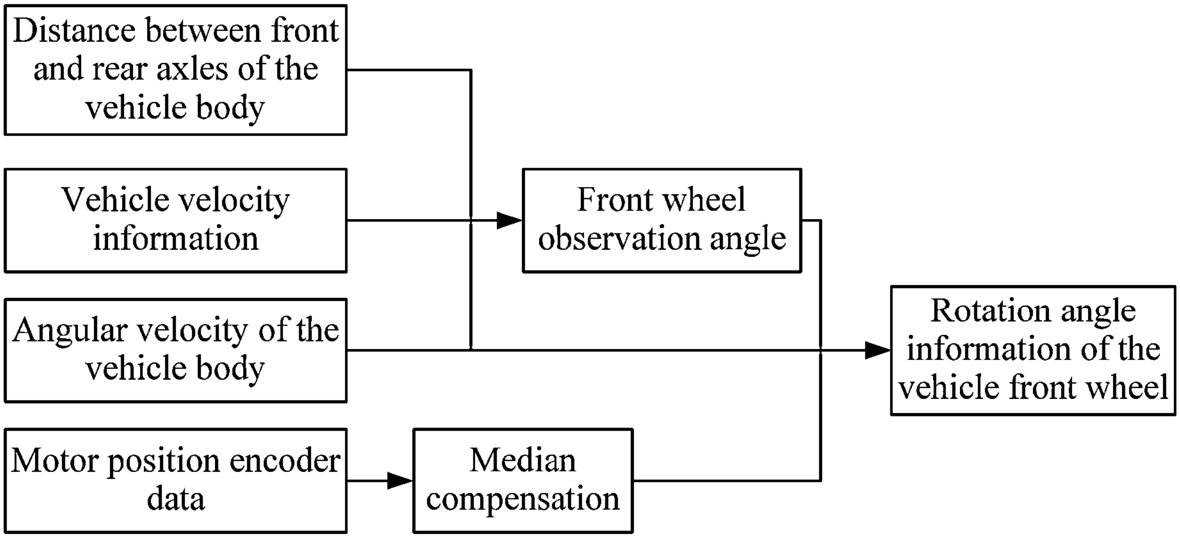
FIG. 7 is a diagram illustrating the acquisition of rotation angle information of a vehicle front wheel according to embodiment three of the present application.

FIG. 7 is a diagram illustrating the acquisition of rotation angle information of a vehicle front wheel according to embodiment three of the present application, as shown in FIG. 7. A front wheel observation angle is acquired based on the distance between the front and rear axles of the vehicle body, the vehicle velocity information, and the angular velocity of the vehicle body; median compensation is performed on the motor position encoder data; the rotation angle information of the vehicle front wheel is acquired.

In the technical solution of this embodiment, the motor position encoder data of the electric steering wheel, vehicle velocity information, the angular velocity of a vehicle determined according to the IMU data, and the distance between the front and rear axles of the vehicle are acquired; a front wheel observation angle is determined based on the vehicle velocity information, the angular velocity of the vehicle, and the distance between the front and rear axles of the vehicle; the rotation angle information of the vehicle front wheel is acquired based on the motor position encoder data and the front wheel observation angle. The operation requirements of the rice transplanter are met through the method suitable for determining the rotation angle information of the front wheels of the rice transplanter. Thus, the technical solution of this embodiment is easy to promote and use.

Embodiment Four

Figure 8:
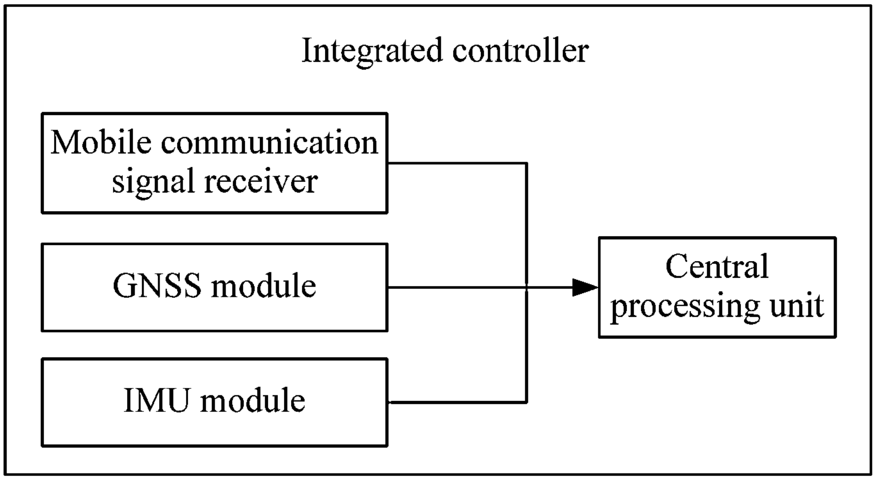
FIG. 8 is a diagram illustrating the structure of an integrated controller according to embodiment four of the present application.

FIG. 8 is a diagram illustrating the structure of an integrated controller according to embodiment four of the present application. As shown in FIG. 8, the integrated controller includes a mobile communication signal receiver, a GNSS module, an IMU module, and a central processing unit.

The mobile communication signal receiver is configured to receive differential information sent by a base station or a server and send the differential information to a GNSS module. The GNSS module is configured to acquire positioning data based on the differential information. The IMU module is configured to acquire IMU data. The central processing unit is configured to acquire attitude angle data based on the positioning data and the IMU data; acquire rotation angle information of a vehicle front wheel based on the IMU data, motor position encoder data of an electric steering wheel, and vehicle size data; acquire target rotation angle information of the vehicle front wheel based on the positioning data, the attitude angle data, the vehicle size data, the rotation angle information of the vehicle front wheel, and planned path data; and generate target control information based on the target rotation angle information and send the target control information to the electric steering wheel so that the electric steering wheel rotates based on the target control information.

In an embodiment, the central processing unit is configured to acquire the rotation angle information of the vehicle front wheel based on the IMU data, the motor position encoder data of the electric steering wheel, and the vehicle size data in the following manners:

The motor position encoder data of the electric steering wheel, vehicle velocity information, the angular velocity of a vehicle body determined according to the IMU data, and the distance between the front and rear axles of the vehicle body are acquired; a front wheel observation angle is determined based on the vehicle velocity information, the angular velocity of the vehicle body, and the distance between the front and rear axles of the vehicle body; the rotation angle information of the vehicle front wheel is acquired based on the motor position encoder data and the front wheel observation angle.

The central processing unit is configured to acquire the rotation angle information of the vehicle front wheel based on the motor position encoder data and the front wheel observation angle in the following manners:

The angular velocity of the vehicle front wheel is determined based on the motor position encoder data; the rotation angle information of the vehicle front wheel is acquired by using a filter model according to the angular velocity of the vehicle front wheel and the front wheel observation angle.

The central processing unit is configured to determine the angular velocity of the vehicle front wheel based on the motor position encoder data in the following manners:

Dead zone correction is performed on the motor position encoder data based on the imported dead zone value; the position increment of the electric steering wheel is determined according to corrected motor position encoder data, and the angular velocity of the electric steering wheel is determined according to the position increment and a sampling period; the angular velocity of the vehicle front wheel is determined according to the angular velocity of the electric steering wheel and a preset function relationship between a steering wheel rotation angle and a rotation angle of the vehicle front wheel.

In an embodiment, the central processing unit is configured to acquire the rotation angle information of the vehicle front wheel based on the motor position encoder data and the front wheel observation angle in the following manner:

The median value in the motor position encoder data is compensated according to the front wheel observation angle and a present function relationship between a steering wheel rotation angle and a rotation angle of the vehicle front wheel; the rotation angle information of the vehicle front wheel is acquired based on compensated motor position encoder data and the preset function relationship between the steering wheel rotation angle and the rotation angle of the vehicle front wheel.

The central processing unit is configured to determine the front wheel observation angle by using the following formula:

$W = \arctan(\varphi_A V_{gnss}/L)$. W denotes the front wheel observation angle. L denotes the distance between the front and rear axles of the vehicle body. $V_{gnss}$ denotes the vehicle velocity information. $\varphi_A$ denotes the angular velocity of the vehicle body.

The integrated controller may be connected to an independent GNSS antenna to achieve dual-antenna directional attitude measurement. The dual antennas may be dual antennas of the GNSS module, and the dual antennas are on one line. The directional attitude measurement includes a heading angle and a pitch angle.

Embodiment Five

Figure 9:
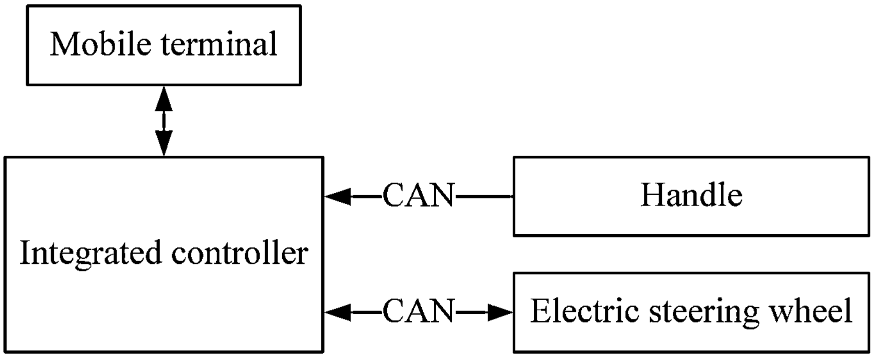
FIG. 9 is a diagram illustrating the structure of an agricultural machinery automatic driving system according to embodiment five of the present application.

FIG. 9 is a diagram illustrating the structure of an agricultural machinery automatic driving system according to embodiment five of the present application, as shown in FIG. 9. The system includes an integrated controller, a handle, and an electric steering wheel.

The handle is configured to enable or disable an automatic driving state based on a user operation and/or send planned path data configured by a user to a central processing unit of the integrated controller. The electric steering wheel is configured to receive target control information sent by the central processing unit and rotate based on the received target control information to drive a vehicle front wheel to rotate. The handle and the electric steering wheel are connected through a controller area network (CAN).

In an embodiment, the system also includes a mobile terminal.

The mobile terminal is communicatively connected to the integrated controller and configured to perform at least one of path planning, vehicle calibration, parameter setting, parameter adjustment, and enabling or disabling automatic driving in the form of web page access.

The mobile terminal may be a device such as a mobile phone, a tablet, or a notebook computer. The mobile phone is used as an example. The agricultural machinery automatic driving system may configure a vehicle parameter, perform mechanical calibration, set a navigation line, and enable or disable automatic driving through the application software or web page on the mobile phone. The mobile phone may be connected to the integrated controller in any one manner such as Bluetooth, Wi-Fi, or a mobile network.

The electric steering wheel includes several parts, that is, a steering drive motor module, a fixed frame module, a clamp module, a sleeve module, and a steering wheel module. The fixed frame module may be installed in a fixed position at the bottom of a steering drive motor and fastened to a steering rod through a matching clamp.

Figure 10:
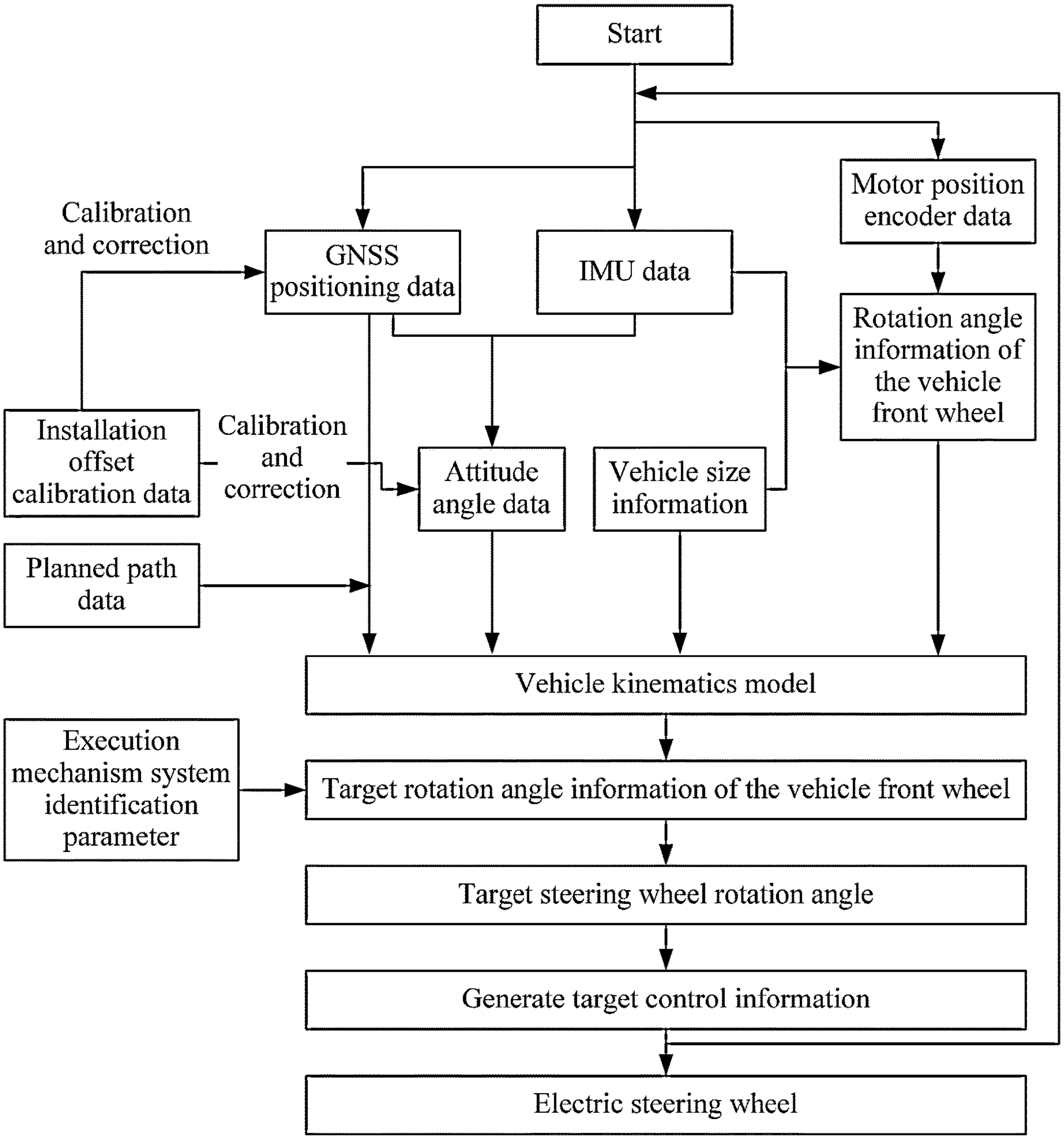
FIG. 10 is an operation flowchart of an agricultural machinery automatic driving system according to embodiment five of the present application.

FIG. 10 is an operation flowchart of an agricultural machinery automatic driving system according to embodiment five of the present application, as shown in FIG. 10. Positioning data output by a GNSS module, IMU data, and motor position encoder data are acquired; attitude angle data is acquired based on the positioning data and the IMU data; the positioning data and attitude angle data are calibrated and corrected based on installation offset calibration data; rotation angle information of a vehicle front wheel is acquired based on the IMU data, vehicle size information, and the motor position encoder data; target control information is generated based on execution mechanism system identification parameters, corrected positioning data and attitude angle data, the vehicle size information, the rotation angle information of the vehicle front wheel, and planned path data to achieve automatic driving of the vehicle. The corrected positioning data and attitude angle data, the vehicle size information, the rotation angle information of the vehicle front wheel, and the planned path data are input into a vehicle kinematics model to obtain target rotation angle information of the vehicle front wheel output by the model; a target steering wheel rotation angle is determined based on target steering angle information and the execution mechanism system identification parameters; target control information is generated based on the target steering wheel rotation angle, and the target control information is sent to an electric steering wheel so that the electric steering wheel rotates based on the target control information. The preceding products may execute the vehicle control method provided by any embodiment of the present application and have corresponding functional modules and effects of executing the method.

Embodiment Six

Figure 11:
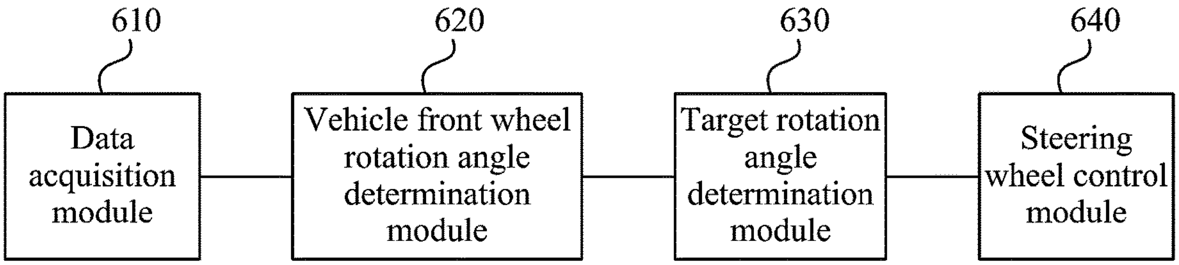
FIG. 11 is a diagram illustrating the structure of a vehicle control apparatus according to embodiment six of the present application.

FIG. 11 is a diagram illustrating the structure of a vehicle control apparatus according to embodiment six of the present application. This embodiment may be applied to the situation of controlling automatic driving of vehicles. This apparatus may be implemented in the form of software and/or hardware and may be integrated into any device that provides the function of the vehicle control method. As shown in FIG. 11, the vehicle control apparatus includes a data acquisition module 610, a vehicle front wheel rotation angle determination module 620, a target rotation angle determination module 630, and a steering wheel control module 640.

The data acquisition module 610 is configured to acquire positioning data output by a global navigation satellite system (GNSS) module and IMU data output by an inertial measurement unit (IMU) module and acquire attitude angle data based on the positioning data and the IMU data. The vehicle front wheel rotation angle determination module 620 is configured to acquire rotation angle information of a vehicle front wheel based on the IMU data, motor position encoder data of an electric steering wheel, and vehicle size data. The target rotation angle determination module 630 is configured to acquire target rotation angle information of the vehicle front wheel based on the positioning data, the attitude angle data, the vehicle size data, the rotation angle information of the vehicle front wheel, and planned path data. The steering wheel control module 640 is configured to generate target control information based on the target rotation angle information and send the target control information to the electric steering wheel so that the electric steering wheel rotates based on the target control information.

In an embodiment, the vehicle front wheel rotation angle determination module 620 includes a first determination unit, a second determination unit, and a vehicle front wheel rotation angle information acquisition unit.

The first determination unit is configured to acquire the motor position encoder data of the electric steering wheel, vehicle velocity information, the angular velocity of a vehicle body determined according to the IMU data, and the distance between the front and rear axles of the vehicle body. The second determination unit is configured to determine a front wheel observation angle based on the vehicle velocity information, the angular velocity of the vehicle body, and the distance between the front and rear axles of the vehicle body. The vehicle front wheel rotation angle information acquisition unit is configured to acquire the rotation angle information of the vehicle front wheel based on the motor position encoder data and the front wheel observation angle.

In an embodiment, the vehicle front wheel rotation angle information acquisition unit includes a vehicle front wheel angular velocity subunit and a first rotation angle determination subunit.

The vehicle front wheel angular velocity subunit is configured to determine the angular velocity of the vehicle front wheel based on the motor position encoder data. The first rotation angle determination subunit is configured to acquire the rotation angle information of the vehicle front wheel by using a filter model according to the angular velocity of the vehicle front wheel and the front wheel observation angle.

In an embodiment, the vehicle front wheel angular velocity subunit is configured to perform the following steps:

Dead zone correction is performed on the motor position encoder data based on the imported dead zone value; the position increment of the electric steering wheel is determined according to corrected motor position encoder data, and the angular velocity of the electric steering wheel is determined according to the position increment and a sampling period; the angular velocity of the vehicle front wheel is determined according to the angular velocity of the electric steering wheel and a preset function relationship between a steering wheel rotation angle and a rotation angle of the vehicle front wheel.

In an embodiment, the vehicle front wheel rotation angle information acquisition unit includes a median compensation subunit and a second rotation angle determination subunit.

The median compensation subunit is configured to compensate the median value in the motor position encoder data according to the front wheel observation angle and a present function relationship between a steering wheel rotation angle and a rotation angle of the vehicle front wheel. The second rotation angle determination subunit is configured to acquire the rotation angle information of the vehicle front wheel based on compensated motor position encoder data and the preset function relationship between the steering wheel rotation angle and the rotation angle of the vehicle front wheel.

The second determination unit is configured to determine the front wheel observation angle by using the following formula:

$W=\arctan(\varphi_A V_{gnss}/L)$. L denotes the distance between the front and rear axles of the vehicle body. $V_{gnss}$ denotes the vehicle velocity information. $\varphi_A$ denotes the angular velocity of the vehicle body.

In an embodiment, the steering wheel control module 640 is configured to perform the following steps:

A preset function relationship between a steering wheel rotation angle and a rotation angle of the vehicle front wheel is acquired; based on the function relationship, a target steering wheel rotation angle corresponding to the target rotation angle information is determined, and the target control information is generated based on the target steering wheel rotation angle.

The preceding products may execute the vehicle control method provided by any embodiment of the present application and have corresponding functional modules and effects of executing the method.

Embodiment Seven

Embodiment seven of the present application provides a computer-readable storage medium. The computer-readable storage medium stores a computer program which, when executed by a processor, performs the vehicle control method according to all embodiments of the present application. Positioning data output by a global navigation satellite system (GNSS) module and IMU data output by an inertial measurement unit (IMU) module are acquired, and attitude angle data is acquired based on the positioning data and the IMU data; rotation angle information of a vehicle front wheel is acquired based on the IMU data, motor position encoder data of an electric steering wheel, and vehicle size data; target rotation angle information of the vehicle front wheel is acquired based on the positioning data, the attitude angle data, the vehicle size data, the rotation angle information of the vehicle front wheel, and planned path data; target control information is generated based on the target rotation angle information, and the target control information is sent to the electric steering wheel so that the electric steering wheel rotates based on the target control information.

Any combination of one or more computer-readable media may be adopted. The computer-readable medium may be a computer-readable signal medium or a computer-readable storage medium. The computer-readable storage medium may be, but is not limited to, an electrical, magnetic, optical, electromagnetic, infrared, or semiconductor system, apparatus, or device, or any combination thereof. Examples (a non-exhaustive list) of the computer-readable storage medium include an electrical connection having one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical memory, a magnetic memory, or any suitable combination thereof. In the document, a computer-readable storage medium may be any tangible medium containing or storing a program that may be used by or in conjunction with an instruction execution system, apparatus, or device.

The computer-readable signal medium may include a data signal propagated in a baseband or as part of a carrier. The data signal carries computer-readable program codes. Such propagated data signals may take a variety of forms, including, but not limited to, electromagnetic signals, optical signals, or any suitable combination thereof. The computer-readable signal medium may also be any computer-readable medium other than the computer-readable storage medium. The computer-readable medium may send, propagate, or transmit a program used by or used in conjunction with an instruction execution system, apparatus, or device.

The program code contained on the computer-readable medium may be transmitted on any suitable medium, including, but not limited to, a wireless medium, a wire, an optical cable, a radio frequency (RF), or any suitable combination thereof.

Computer program codes for performing the operations of the present application may be written in one or more programming languages or combination thereof, including object-oriented programming languages such as Java, Smalltalk, C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to a remote computer, the remote computer may be connected to a user computer via any kind of network including a local area network (LAN) or a wide area network (WAN) or may be connected to an external computer (for example, via the Internet by an Internet service provider).

What is claimed is:

1. A vehicle control method, comprising:

acquiring positioning data output by a global navigation satellite system (GNSS) module and IMU data output by an inertial measurement unit (IMU) module, and acquiring attitude angle data based on the positioning data and the IMU data;

acquiring rotation angle information of a vehicle front wheel based on the IMU data, motor position encoder data of an electric steering wheel, and vehicle size data;

acquiring target rotation angle information of the vehicle front wheel based on the positioning data, the attitude angle data, the vehicle size data, the rotation angle information of the vehicle front wheel, and planned path data; and generating target control information based on the target rotation angle information, and sending the target control information to the electric steering wheel so that the electric steering wheel rotates based on the target control information.

2. The method of claim 1, wherein acquiring the rotation angle information of the vehicle front wheel based on the IMU data, the motor position encoder data of the electric steering wheel, and the vehicle size data comprises:

acquiring the motor position encoder data of the electric steering wheel, vehicle velocity information, an angular velocity of a vehicle body determined according to the IMU data, and a distance between front and rear axles of the vehicle body in the vehicle size data;

determining a front wheel observation angle based on the vehicle velocity information, the angular velocity of the vehicle body, and the distance between the front and rear axles of the vehicle body; and acquiring the rotation angle information of the vehicle front wheel based on the motor position encoder data and the front wheel observation angle.

3. The method of claim 2, wherein acquiring the rotation angle information of the vehicle front wheel based on the motor position encoder data and the front wheel observation angle comprises:

determining an angular velocity of the vehicle front wheel based on the motor position encoder data; and acquiring, by using a filter model, the rotation angle information of the vehicle front wheel according to the angular velocity of the vehicle front wheel and the front wheel observation angle.

4. The method of claim 3, wherein determining the angular velocity of the vehicle front wheel based on the motor position encoder data comprises:

performing dead zone correction on the motor position encoder data based on an imported dead zone value;

determining a position increment of the electric steering wheel according to corrected motor position encoder data, and determining an angular velocity of the electric steering wheel according to the position increment and a sampling period; and determining the angular velocity of the vehicle front wheel according to the angular velocity of the electric steering wheel and a preset function relationship between a steering wheel rotation angle and a rotation angle of the vehicle front wheel.

5. The method of claim 2, wherein acquiring the rotation angle information of the vehicle front wheel based on the motor position encoder data and the front wheel observation angle comprises:

compensating a median value in the motor position encoder data according to the front wheel observation angle and a preset function relationship between a steering wheel rotation angle and a rotation angle of the vehicle front wheel; and acquiring the rotation angle information of the vehicle front wheel based on compensated motor position encoder data and the preset function relationship between the steering wheel rotation angle and the rotation angle of the vehicle front wheel.

6. The method of claim 2, wherein the front wheel observation angle is determined by using a following formula:

$$W = \arctan\left(\frac{\varphi_A V_{gnss}}{L}\right);$$

wherein W denotes the front wheel observation angle, L denotes the distance between the front and rear axles of the vehicle body, $V_{gnss}$ denotes the vehicle velocity information, and $\varphi_A$ denotes the angular velocity of the vehicle body.

7. The method of claim 1, wherein generating the target control information based on the target rotation angle information comprises:

acquiring a preset function relationship between a steering wheel rotation angle and a rotation angle of the vehicle front wheel; and determining, based on the function relationship, a target steering wheel rotation angle corresponding to the target rotation angle information, and generating the target control information based on the target steering wheel rotation angle.

8. A non-transitory computer-readable storage medium storing a computer program which, when executed by a processor, performs the vehicle control method of claim 1.

9. An integrated controller, comprising:

a mobile communication signal receiver, which is configured to receive differential information sent by a base station or a server and send the differential information to a global navigation satellite system (GNSS) module;

the GNSS module, which is configured to acquire positioning data based on the differential information;

an inertial measurement unit (IMU) module, which is configured to acquire IMU data; and a central processing unit, which is configured to acquire attitude angle data based on the positioning data and the IMU data; acquire rotation angle information of a vehicle front wheel based on the IMU data, motor position encoder data of an electric steering wheel, and vehicle size data; acquire target rotation angle information of the vehicle front wheel based on the positioning data, the attitude angle data, the vehicle size data, the rotation angle information of the vehicle front wheel, and planned path data; and generate target control information based on the target rotation angle information and send the target control information to the electric steering wheel so that the electric steering wheel rotates based on the target control information.

10. The controller of claim 9, wherein the central processing unit is configured to acquire the rotation angle information of the vehicle front wheel based on the IMU data, the motor position encoder data of the electric steering wheel, and the vehicle size data in the following manners:

acquiring the motor position encoder data of the electric steering wheel, vehicle velocity information, an angular velocity of a vehicle body determined according to the IMU data, and a distance between front and rear axles of the vehicle body in the vehicle size data;

determining a front wheel observation angle based on the vehicle velocity information, the angular velocity of the vehicle body, and the distance between the front and rear axles of the vehicle body; and acquiring the rotation angle information of the vehicle front wheel based on the motor position encoder data and the front wheel observation angle.

11. The controller of claim 10, wherein the central processing unit is configured to acquire the rotation angle information of the vehicle front wheel based on the motor position encoder data and the front wheel observation angle in the following manners:

determining an angular velocity of the vehicle front wheel based on the motor position encoder data; and acquiring, by using a filter model, the rotation angle information of the vehicle front wheel according to the angular velocity of the vehicle front wheel and the front wheel observation angle.

12. The controller of claim 11, wherein the central processing unit is configured to determine the angular velocity of the vehicle front wheel based on the motor position encoder data in the following manners:

performing dead zone correction on the motor position encoder data based on an imported dead zone value;

determining a position increment of the electric steering wheel according to corrected motor position encoder data, and determining an angular velocity of the electric steering wheel according to the position increment and a sampling period; and determining the angular velocity of the vehicle front wheel according to the angular velocity of the electric steering wheel and a preset function relationship between a steering wheel rotation angle and a rotation angle of the vehicle front wheel.

13. The controller of claim 10, wherein the central processing unit is configured to acquire the rotation angle information of the vehicle front wheel based on the motor position encoder data and the front wheel observation angle in the following manners:

compensating a median value in the motor position encoder data according to the front wheel observation angle and a preset function relationship between a steering wheel rotation angle and a rotation angle of the vehicle front wheel; and acquiring the rotation angle information of the vehicle front wheel based on compensated motor position encoder data and the preset function relationship between the steering wheel rotation angle and the rotation angle of the vehicle front wheel.

14. The controller of claim 10, wherein the central processing unit is configured to determine the front wheel observation angle by using a following formula:

$$W = \arctan\left(\frac{\varphi_A V_{gnss}}{L}\right);$$

wherein W denotes the front wheel observation angle, L denotes the distance between the front and rear axles of the vehicle body, $V_{gnss}$ denotes the vehicle velocity information, and $\varphi_A$ denotes the angular velocity of the vehicle body.

15. An agricultural machinery automatic driving system, comprising the integrated controller of claim 9, a handle, and an electric steering wheel; wherein the handle is configured to perform at least one of the following: enabling or disabling an automatic driving state based on a user operation or sending planned path data configured by a user to a central processing unit of the integrated controller; and the electric steering wheel is configured to receive target control information sent by the central processing unit and rotate based on the received target control information to drive a vehicle front wheel to rotate.

16. The system of claim 15, further comprising:

a mobile terminal communicatively connected to the integrated controller and configured to perform at least one of path planning, vehicle calibration, parameter setting, and parameter adjustment in a form of web page access.

17. An agricultural machinery automatic driving system, comprising the integrated controller of claim 10, a handle, and an electric steering wheel; wherein the handle is configured to perform at least one of the following: enabling or disabling an automatic driving state based on a user operation or sending planned path data configured by a user to a central processing unit of the integrated controller; and the electric steering wheel is configured to receive target control information sent by the central processing unit and rotate based on the received target control information to drive a vehicle front wheel to rotate.

18. An agricultural machinery automatic driving system, comprising the integrated controller of claim 11, a handle, and an electric steering wheel; wherein the handle is configured to perform at least one of the following: enabling or disabling an automatic driving state based on a user operation or sending planned path data configured by a user to a central processing unit of the integrated controller; and the electric steering wheel is configured to receive target control information sent by the central processing unit and rotate based on the received target control information to drive a vehicle front wheel to rotate.

19. An agricultural machinery automatic driving system, comprising the integrated controller of claim 12, a handle, and an electric steering wheel; wherein the handle is configured to perform at least one of the following: enabling or disabling an automatic driving state based on a user operation or sending planned path data configured by a user to a central processing unit of the integrated controller; and the electric steering wheel is configured to receive target control information sent by the central processing unit and rotate based on the received target control information to drive a vehicle front wheel to rotate.

20. A vehicle control apparatus, comprising:

at least one processor, and a memory, which is configured to store at least one program; wherein the at least one program, when executed by the at least one processor, causes the at least one processor to:

acquire positioning data output by a global navigation satellite system (GNSS) module and IMU data output by an inertial measurement unit (IMU) module and acquire attitude angle data based on the positioning data and the IMU data;

acquire rotation angle information of a vehicle front wheel based on the IMU data, motor position encoder data of an electric steering wheel, and vehicle size data;

acquire target rotation angle information of the vehicle front wheel based on the positioning data, the attitude angle data, the vehicle size data, the rotation angle information of the vehicle front wheel, and planned path data; and generate target control information based on the target rotation angle information and send the target control information to the electric steering wheel so that the electric steering wheel rotates based on the target control information.

* * * * *